United States Patent
Davar et al.

(10) Patent No.: US 9,032,302 B2
(45) Date of Patent: *May 12, 2015

(54) PROVIDING A USER WITH A WEB-SUPPLEMENT

(71) Applicants: Jonathan Davar, Los Altos Hills, CA (US); Serge M. Krasnyansky, New York, NY (US)

(72) Inventors: Jonathan Davar, Los Altos Hills, CA (US); Serge M. Krasnyansky, New York, NY (US)

(*) Notice: Subject to any disclaimer, the term of this patent is extended or adjusted under 35 U.S.C. 154(b) by 35 days.

This patent is subject to a terminal disclaimer.

(21) Appl. No.: 13/899,890

(22) Filed: May 22, 2013

(65) Prior Publication Data

US 2013/0254215 A1 Sep. 26, 2013

Related U.S. Application Data

(63) Continuation of application No. 13/588,169, filed on Aug. 17, 2012, now Pat. No. 8,479,100, which is a continuation of application No. 12/316,992, filed on Dec. 18, 2008, now Pat. No. 8,276,079.

(60) Provisional application No. 61/008,957, filed on Dec. 21, 2007.

(51) Int. Cl.
G06F 15/00 (2006.01)
G06F 13/00 (2006.01)
H04L 29/06 (2006.01)
G06F 17/30 (2006.01)

(52) U.S. Cl.
CPC ........ *H04L 65/403* (2013.01); *G06F 17/30861* (2013.01); *G06F 17/3053* (2013.01)

(58) Field of Classification Search
CPC .......... G06F 17/30861; G06F 17/3053; H04L 65/403
USPC ................ 715/738, 749, 763–765, 740–744, 715/851–853, 769
See application file for complete search history.

(56) References Cited

U.S. PATENT DOCUMENTS

| 2007/0121843 | A1 | 5/2007 | Atazky et al. | |
| 2008/0022220 | A1* | 1/2008 | Cheah | 715/769 |
| 2009/0164641 | A1* | 6/2009 | Rogers et al. | 709/227 |

* cited by examiner

*Primary Examiner* — Kevin Nguyen
(74) *Attorney, Agent, or Firm* — Brian R. Short

(57) ABSTRACT

An apparatus and method of providing a user with a web-browser supplement is disclosed. One method includes providing access to a focal group, wherein the focal group includes at least one member having at least one association with the user. Access is provided to information associated with the at least one member having relevance to the focal group. Web browsing by the user is supplemented by the information of the members of the focal group.

20 Claims, 10 Drawing Sheets

PROVIDING A USER WITH A WEB-SUPPLEMENT

RELATED APPLICATIONS

This patent application is a continuation of U.S. patent application Ser. No. 13/588,169, filed Aug. 17, 2012, which is a continuation of U.S. patent application Ser. No. 12/316,992, filed Dec. 18, 2008 and Granted as U.S. Pat. No. 8,276,079, which claims priority to provisional patent application No. 61/008,957, filed Dec. 21, 2007, which are all herein incorporated by reference.

FIELD OF THE DESCRIBED EMBODIMENTS

The described embodiments relate generally to web browsing. More particularly, the described embodiments relate to a method and apparatus for supplementing a user's web browsing.

BACKGROUND

The internet can connect individuals through, for example, a mesh of social networks, portals, commerce sites and forums. Many of these sites attempt to model relationships to facilitate commerce and build systems for providing recommendations. These social networks include many individuals that can interact with each other.

There is a lack, however, of a useful mechanism within social networks for mimicking interpersonal trust and reference networks. For example, if one needs to find a babysitter, a heart surgeon or a plumber, one generally turns to trusted friends to obtain references. That is, these referred service providers involve the well-being of family, and/or impact ones finances, and therefore, are typically naturally screened by the person looking for a reference. However, the recommendations provided by social networks do not include a personal connection between the recommender and the receiver of the recommendation. Additionally, the strength of the recommendations can be difficult to determine.

It is desirable to have a method, system and apparatus in which groups of commonly associated individuals can provide an internet user that is web browsing with additional intelligence. It is additionally desirable that the method, system and apparatus be adaptively updated as information associated with the groups change over time.

SUMMARY

One embodiment includes a method of providing a user with a web-browser supplement. The method includes providing access to a focal group, wherein the focal group includes at least one member having at least one association with the user. Access is provided to information associated with the at least one member having relevance to the focal group. Web browsing by the user is supplemented by information of the members of the focal group.

Another embodiment includes a method of overlaying web browsing with focal group intelligence. The method includes creating a focal group, wherein the focal group includes at least one other user having at least one association with the user. Information about the at least one other user having relevance to the focal group is obtained. Web browsing by the user is over-layed, thereby supplementing the web browsing by the user by providing information of the other users of the focal group.

Other aspects and advantages of the described embodiments will become apparent from the following detailed description, taken in conjunction with the accompanying drawings, illustrating by way of example the principles of the described embodiments.

DETAILED DESCRIPTION

Figure 1:
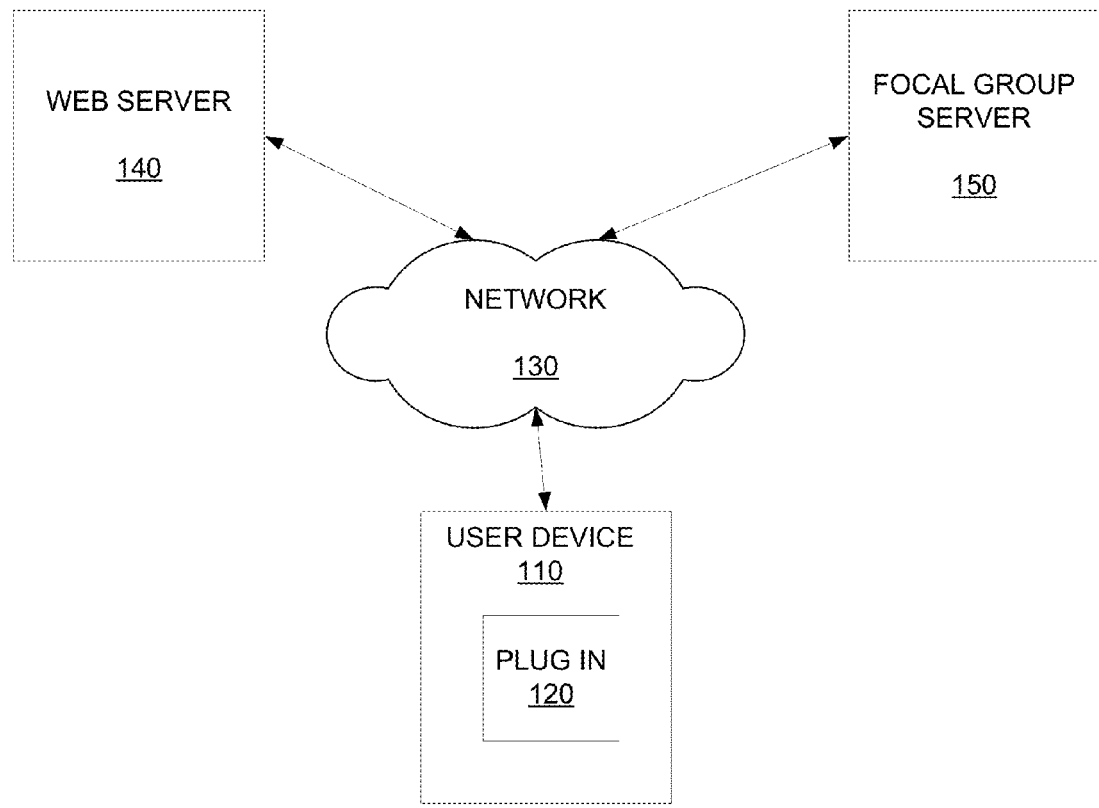
FIG. 1 shows an example of a user computing device that can utilize methods of supplementing web browsing of the user.

As shown in the drawings for purposes of illustration, the described embodiments are embodied in an apparatus and method for supplementing web browsing of a user. The web browsing can be of any form including textual, audio or visual formats, and can be supplemented with any combinations of textual, audio or visual formats, or any other format that can be used for web browsing.

FIG. 1 shows an example of a computing device 110 that can utilize methods of supplementing web browsing of a user of the computing device 110. For this embodiment, the user's computing devices includes a plug-in 120. An embodiment of the plug-in 120 is a software program that when executed supplements the user's web browsing by supplementing information provided by the web browsing with information associated with a focal group. That is, the user's web browsing is improved by manipulating the information provided to the user based on intelligence and information provided by members of the focal group, or obtained by members of the focal group.

As shown, the computing device 110 is connected through a network 130 to web server 140 and a focal group server 150. For this example, the web server 140 allows the user to "surf" the internet, and access web pages. The web pages provide the user with information related to a subject as generally (but not exclusively) determined by the user. The web server 140 and the focal group server 150 are shown as separate servers. However, it is to be understood that this is merely one example of how access to web page information and focal group information can be provided.

As shown, the focal group server 150 maintains information of the focal group. Generally, this information includes the members of one or more focal groups that have some relationship with the user. Additionally, the focal group server 150 can maintain information of each user of each focal group. As will be described, the members of the focal group can be one or more individuals and/or corporate entities. The focal group can be created, or borrowed from somewhere else. The information associated with each member can include many things, such as, for example, preferences, knowledge, history of interactions with the user, and/or experiences of the member. Additionally, the focal group information can be supplemented with focal group applications.

Supplementing Web Browsing

Supplementing the user's web browsing can be provided in one or more ways. The web browsing can be supplemented by, for example, providing additional information to information provided by a web page, filtering information of the web page, and/or sorting information of the web page. Again, the supplementation is based on the information associated with members of the focal group, and therefore, the intelligence of the focal group members can be used to the advantage of the user when web browsing.

Focal Groups

Generally, a focal group is a small restricted group of people who are associated based on activity or topic. The focal group can include, for example, a group of friends, family members or people with common interests. As will be described, a focal group can include any number of members. The member can be individual people or even corporate entities. The focal group can include, for example, a single person who is considered an expert in a particular subject area, or the focal group can include many individual who are commonly associated by some activity or other criteria. The focal groups can be formed, or borrowed from somewhere else.

Focal Group Information

As described, web browsing of the user is supplemented by the focal group information. The focal group information can include, for example, a proficiency of group members, a degree of affinity between group members, a history of proficiency and affinity of group members, a member's rating by group members, reviews and/or opinions of the member, any information contributed by members, events involving a group member, actions taken by a group member, requests for information put in by other group members for a group member, and/or member ownership of a product or usage of a service. It is to be understood that an embodiment includes the focal group information being dynamic. Actions by each of the focal group member can cause the focal group information to change.

The described embodiments can include various types of information associated with the members of the focal group. One type of information is the affinity of each focal group member with the user. The affinity can be adaptive, and is generally based on the strength of the relationship and level of interaction between the each focal group member and the user. The affinity can be "deduced" and/or "assigned". An assigned affinity is one that is given by one focal group member to another, based on an individual perception or information. A deduced affinity is one that is computed automatically from several assigned affinities, based on one or more affinity formulas.

For other embodiments, another type of information is a proficiency of each focal group member. The proficiency can be adaptive based on the level of competence and/or expertise regarding a subject matter. Proficiency can be "deduced" and/or "assigned". An assigned proficiency is one that is given by one focal group member to another, based on an individual perception or information. A deduced proficiency is one that is adaptively computed automatically from several assigned proficiencies.

For other embodiments, another type of information includes focal group applications that can, for example, extend the overlay and run within the framework of overlay. An example of a focal group application includes, for example, an "add to wish list" application, that includes an icon displayed on a web page, such that when the icon is clicked (selected), it adds a given item (displayed on the original web page) to a focal group member's wish list. (A wish list in this context is a list of items that the user wishes to own—the list is maintained by the focal group user so that other users can access it, and provide, for example, gift ideas).

Overlay

As described, an embodiment of the supplementing the user's web browsing includes providing the user with a web overlay. The overlay provides an intelligent software framework that runs focal group applications, supplements, filters, sorts and displays the browsed information.

Overlay Plug In

An embodiment of the overlay plug in includes a software component installed on a user's computer. For an embodiment, the plug in is installed in a web browser as an extension. For an embodiment, the purpose of the plug in is to provide the user with access to Focal Group servers and communicate with the servers. More specifically, this embodiment includes sending contextual information describing the web location being visited by the user, and/or receiving instructions and information and/or knowledge enabling the plug-in software to supplement the browsed info.

Figure 2:
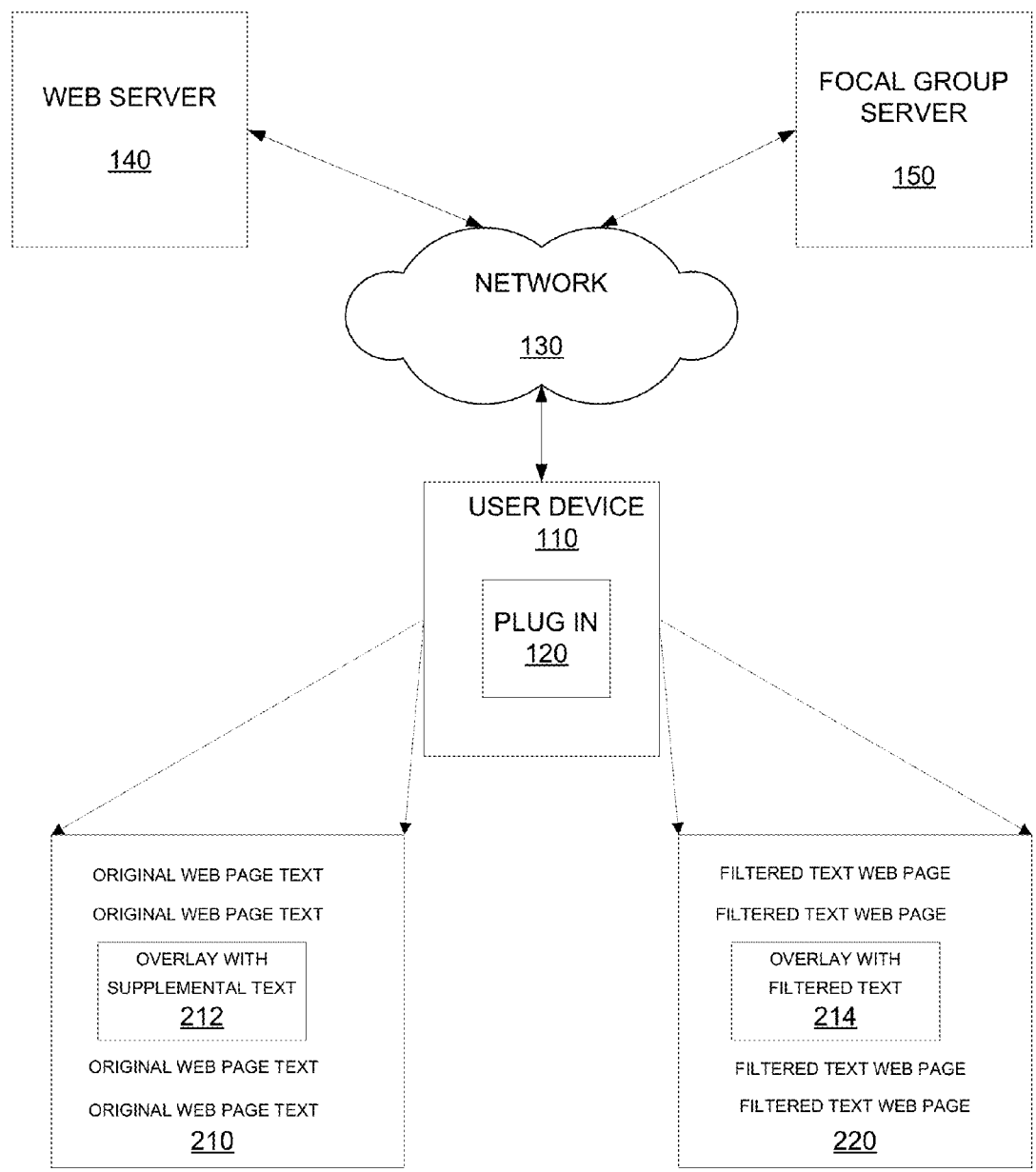
FIG. 2 shows the computing device of FIG. 1, and examples of supplementing web pages being browsed by the user.

FIG. 2 shows the computing device of FIG. 1, and examples of supplementing web pages being browsed by the user. FIG. 2 includes two exemplary web pages 210, 220 that have been supplemented by information of a focal group.

The web page 210 provides an example of a web overlay that supplements a web page being displayed by the computing device 110 by providing additional information to the display that is, for example, related to the information of the original web page being displayed by the computing device. The additional information provides the user with related information from a more likely to be trusted source (the focal group). The web page 210 as viewed by the user includes the original web page text, but additionally includes the overlay 212 that includes supplement text that can be related to the information of the web page. The supplemental text of the overlay is derived or based on the information associated with the members of the focal group.

The web page 220 provides another example of a web overlay that supplements a web page displayed by a computing device 110 by filtering information of the web page 220. That is, based on the information of the focal group, information of the original web page is filtered, thereby providing the web user with a better presentation of the original web page based on the information of the members of the focal group. The overlay 214 can include filtered or sorted information of the information associated with focal group. For one embodiment, the sorting and/or filtering of the information associated with the focal group is based on the information of the web page 220. That is, either or both the information of the web page, or the information presented by the overlay 214, can be filtered and/or sorted based on the other of the information of the web page and the information presented by the overlay 214.

Figure 3:
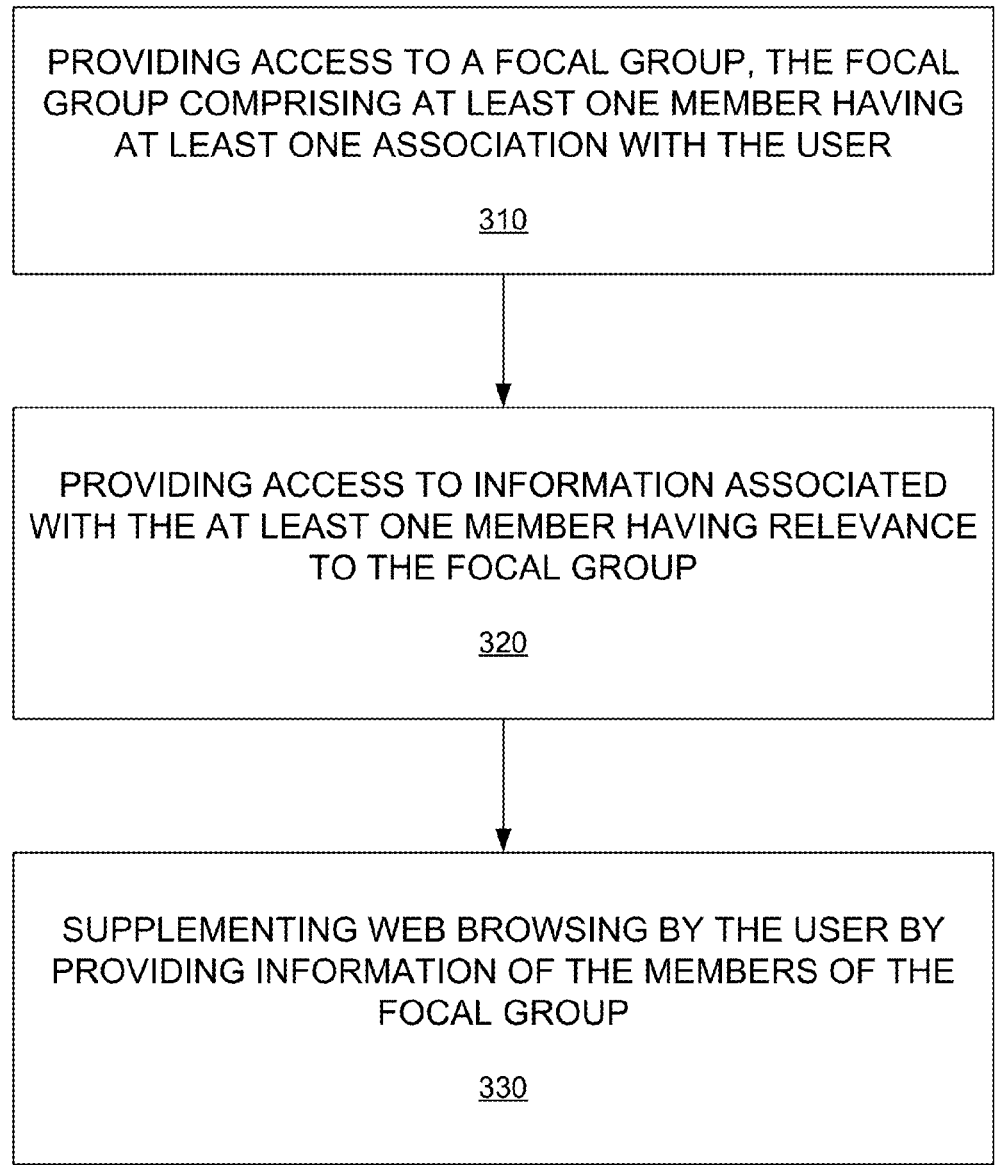
FIG. 3 is a flow chart that includes steps of an example of a method of supplementing a user's web browsing.

FIG. 3 is a flow chart that includes steps of an example of a method of supplementing a user's web browsing. A first step 310 includes providing access to a focal group, the focal group comprising at least one member having at least one association with the user. A second step 320 includes providing access to information associated with the at least one member having relevance to the focal group. A third step 330 includes supplementing web browsing by the user by providing information of the members of the focal group.

As previously described, one embodiment includes a plug-in loaded on the user's computer, that when executed, supplements the user's web browsing. A more specific embodiment includes the plug-in providing the user with a web-browser overlay. Execution of the plug-in provides the user with the web overlay that supplements web browsing by the user. More specifically, one embodiment includes the web overlay providing the information associated with the at least one member that has relevance to the web browsing of the user. Other embodiments include the web overlay filtering, and/or sorting information of, for example, a web page based on the information associated with the at least one focal group member.

For proper operation, the plug-in has access to the focal group, and to the information associated with the at least one member of the focal group. As previously described, the access can be through a network connected to the user's computer, and to one or more servers that maintain the members of the focal group, and the information associated with each of the users of the focal group.

As previously described, an embodiment for supplementing the web browsing includes an overlay. Based on information of, for example, web page being browsed by the user, an embodiment includes the overlay providing at least some of the information of the at least one member of the focal group. The web browsing of the user is supplemented by providing the user with focal group intelligence. That is, the information provided by the overlay enhances and improves the user's web browsing by providing the user with additional intelligence as provided by the information of each of the members of the focal group.

One embodiment includes the information provided by the overlay relating to information of a web page being browsed by the user. That is, the overlay supplements the web browsing by providing additional information (focal group information) that is related to the information being provided by the web site. Additional information can include, for example, past experiences of one or more of the focal group members, and/or recommendations by the one or more focal group members based on the past experiences.

The overlay can additionally or alternatively use the information of the focal group to filters information of the web browsing. That is, the information provided by web browsing can be filtered based on the information of the focal group. All of the information provided be a web page may not be useful, and the user's web browsing can in some situations be improved by filtering the information of the web page. One method of filtering the information includes filtering it based on information of the members of the focal group.

For example, a user can visit on online book store and view a page displaying a set of books. However, if the user has the overlay plug-in enabled, the displayed set of books may be a subset of the original results of the query, wherein the subset displayed is based on the filtering performed by the overlay plug-in. That is, for example, only the books owned or reviewed by members of the Focal Group, or by members having a certain affinity to the user or proficiency in the subject matter may be displayed.

The overlay can additionally or alternatively use the information of the focal group to sorts information of the web browsing based on the information of the at least one member of the focal group. That is, the information of the web can be sorted based on the information of the focal group.

For example, a user can visit a website that provides restaurant reviews, and the user can submit a query to find a good restaurant in a particular area. Originally (without the overlay), the results of the query that are returned by the website, for example, is sorted by ratings given by random reviewers. However, if the user has the overlay plug-in enabled, the sorting of the displayed results are further improved by strategically positioning the reviews produced by the members of the user's focal group who have high affinity or high proficiency in the subject (restaurant knowledge).

The overlay can additionally or alternatively filter the information provided by the overlay based upon the information of the web page. For example, if a user is visiting a photography website, one embodiment includes the overlay plug-in displaying information about only those members of the user's focal group that have relevance to the browsed page(s) in the photography website. For example, a user looking at a camera review of a website views (on the display) only the information of those members of the focal group who have reviewed or own the camera.

An embodiment of the overlay includes highlighting at least one web page with visual identifiers. The visual identifiers are related to the information associated with the at least one member having relevance to the focal group.

For example, if a user is browsing products at an online tennis gear store, each product can be visually annotated by the overlay plug-in with icons that reflect information from the focal group relevant to that product. Furthermore, the user can be allowed to click on (select) an icon to submit the information about the product he/she would like to be reviewed by the focal group.

It is to understood that the visual identifier include any one of many different implementations. That is, for example, the visual identifiers do not have to be icons. Additionally, other types of iterations between the user and other focal group members can be initiated by the visual identifiers.

For another example, the visual overlay depicts the affinity map of the user with the members of the focal group, and highlighting those members that are relevant to the browsed page. Exemplary affinity maps are provided in FIGS. 4A, 4B.

Another embodiment of the overlay further includes at least one of fetching or requesting the information of the at least one member of the focal group. For example, a user may click on icon provided by the overlay next to a product to request a specific member of the focal group to provide an opinion or a review about the product. This embodiment is very useful because it enables rapidly growth of the information of the entire focal group network, therefore making the overlay more powerful. Another embodiment allows, for example, a user to click (select) an icon, allowing the user to customize a review form and send it to members of the focal group.

It is to be understood that there can be methods other than the use of an overlay for at least one of filtering, sorting or appending information to information of a web page based on the information associated with the at least one member. That is, an overlay as shown and described here is one method of supplementing web browsing. Other methods of supplementing web browsing based on the information of a focal group are also possible.

An embodiment includes ranking the information associated with the members of the focal group. The general reasoning being that higher ranked information can have a greater influence on how the web browsing of the user is supplemented. For example, one focal group member may be identified as being a particularly good expert on the subject matter of the web page being accessed by the user. Accordingly an embodiment includes the information associated with the at least one member having relevance to the focal group, being ranked by a level of importance. For one embodiment the ranking of the level of importance of information is influenced by a perceived level of importance of each of the at least one member associated with the information. Other embodiments include the perceived level of importance of each of the at least one member being influenced by at least one of a member rank on a relevant topic, a level of affinity between the user and each member, a level of expertise of each member, a level of trust of each member, a level of performance of past information provided by each member, a level of proficiency of each member.

One embodiment includes the affinity between the user and each focal group member having substantial influence over the ranking assigned to each focal group member. This can include, for example, the level of affinity between the user and each member adaptively varying over time based on actions of each member, or the user. If, for example, the user has elected to enable the overlay plug-in access to the user's web-email account, then the overlay can infer changes in the affinity between focal group members based on, for example, how often the members send e-mails to each other. The affinity levels can fluctuate over time, based on increase or decrease of e-mailing activity between focal group members. It is to be understood that inferences of affinity variations are not limited to e-mail interactions between users. That is, other types of interactions between focal group members can influence the affinity between the members as well.

Another embodiment includes executing at least one focal group application within a web browser based on information of the members of the focal group. One example of a focal group application includes executing the at least one focal group application comprises requesting additional information from the members of the focal group. That is, for example, the user can invite or solicit another member of the focal group to provide a review/opinion about something. One embodiment additionally includes overlaying the focal group application(s) over a web page being viewed by the user.

One example of a focal group application allows a user to join a focal group purchasing consortium to negotiate a better price with any vendor. A vendor can be any online store, as well as any focal group member. For one embodiment, a vendor can join a focal group and offer group discounts to focal group members. The focal group application retrieves vendor information relevant to that product and displays it to the user browsing another web page with relevant products or information (such as, pricing, targeted ads, or "sponsored" focal group results).

An example of a focal group overlay application includes an overlay browser plug-in installed into a user's web browser, and a focal group overlay web server. An exemplary embodiment of the focal group overlay web server includes focal network application business logic, a database, an application programming interface (API), and connection to a friend network provider. The focal network application business logic can include a layer of software code that embodies the actual logical rules related to updating and keeping current all focal group relations, data, and information. The layer of software code includes "business logic" as opposed to the other layers of the code that include common frameworks, web and database infrastructure. The database provides storage for focal group contents and focal group information. The API provides communication to the overlay plug-in. The connection to the friend network provides a connection to at least one of any available social networks.

The described embodiments can be illustrated by one example (a user browsing a catalog of products on an online store) of providing a user with a web-browser supplement. Initially, a user arrives at a merchandise selection webpage in an online store. An overlay plug-in sends a uniform resource locator (URL) of the browsed page to a focal group overlay web server, invoking a corresponding API call. In response, the focal group overlay server sends information parsing rules that allow the overlay plug-in to analyze the content of the page. The overlay plug-in analyzes the web page and parses the identity information about each particular product, such as product brand, product title, product model, serial number or PLU or barcode. The overlay invokes another server API call, passing the collected information to the focal group overlay web server. The focal group web server can respond, for example, with multiple lists for each identified product on the page.

An exemplary list can include a list of "experts". That is, members of the focal group sorted by highest proficiency, with names, photos and other information about each member, including any related product reviews created by these members.

Another exemplary list includes a list of "close friends". That is, members of the focal group sorted by highest affinity, with similar information for each member.

Another exemplary list includes a list of "actions" related to this product. The actions list can include a "request review" in which a user is able to ask one or more members of a focal group for an opinion/review of this item. Other action lists can include, for example, a "Submit review" in which a user can provide his/her own review, an "I own it" in which a user can let other members of the focal know that he/she owns this item, a "Rate it" in which a user provides a "thumbs-up/thumbs-down" type of quick voting button, to let the user cast a rating vote about this product, an "Add to wish list" in which a user can let other focal group members know that this is an item he/she doesn't mind receiving as a gift, and a "Group bargain" in which a user can add him/herself into a group of people who want to team up for buying this item at a bulk discount.

As previously described, the focal group overlay can include focal group applications. The focal group overlay can include, for example, an action button (or icon) that invokes a specialized focal group application. The plug-in can render (creates visual elements for), for example, two lists of focal group members (reviews of experts & reviews of friends) as well as action icons/buttons that enhance the currently browsed page. The resulting page that is displayed to the user, is a merge of the original product page, as sent by the web server of the online store, plus the elements created by the overlay plug-in. The additional visual elements (pictures of focal group experts/friends and action buttons) are displayed next to the related product items on the page. The user can click on (select) any friend or expert's photo or name, and read the review or rating for each product. Additionally, the user can click on any "action" icon to invoke the corresponding action. This way, the user is able to use the knowledge of his/her focal group to help decide on the purchase of a product. Using the "action" icons, the user contributes to the knowledge of his focal group (e.g. by providing his/her own review, or by requesting a review).

An embodiment of the web-browser supplement allows, for example, third party developers to add their own focal group applications. One example of a focal group application includes a mini-button or an icon displayed next to any item on the page that is recognized by the overlay as a target item (i.e. around which the overlay creates some enhanced content, or filtering, or sorting). Additionally, a set of configuration directives specifying the kinds of items (products, services, etc.) that this application are enabled for one or multiple web-pages of the application that augment the existing web-pages within the focal group overlay web server. The existing web-pages are the web-pages that the users see when they click on the mini-button. These items can be uploaded by a focal group application developer to the focal group overlay web server via, for example, a special application-registration form.

For an embodiment, all focal group applications, including those provided within the focal group overlay website by default, use the same API to retrieve and manipulate focal net information. The focal group API provides the focal group application with access to the focal net information. The focal net information can include, but not limited to, social graph links, affinity and proficiency information, user profile information (as restricted by the user's access preferences), focal group affiliation, user-created reviews, ratings, and/or any user-related information contributed/created by other focal group applications.

Another embodiment includes providing user web browsing results to other websites, and mining additional information from the other websites for additionally supplementing the web browsing by the user. For example, if a user is looking at a camera of brand "A" in an online photography store, the focal group application can send relevant information to a camera-maker company of brand "B". The camera-maker company can then send competitive pricing information on the same or comparable product. The information about camera "B" can then be presented to the user browsing information about camera "A" via overlay's enhancing the web page. As a result, the user is better informed about comparable products.

As previously described, the information associated with member of the focal group can be adaptively updated. For example, one embodiment includes adaptively updating the information associated with the at least one member based on web browsing of the user. Another embodiment includes adaptively updating the information associated with the at least one member based on web browsing of the members. For example, if a focal group member is considered an expert in tennis (that is, has a high focal group proficiency rating) and is buying a tennis racquet in an online store, the information about the purchase may be considered useful, and therefore, is sent to the focal group and appended to the rest of the existing focal group information.

Figure 4A:
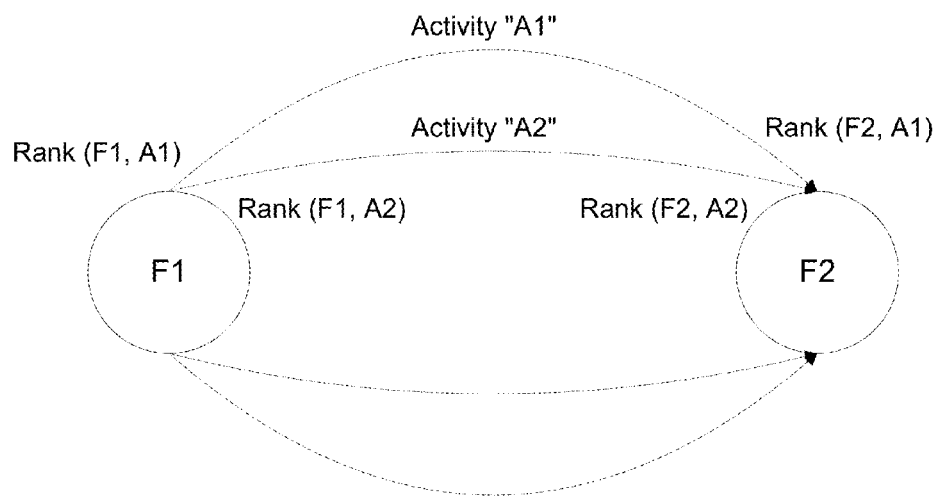
FIG. 4A shows an example of a visual display that can be used to adaptively depict relationships between a user and members of a focal group.
Figure 4B:
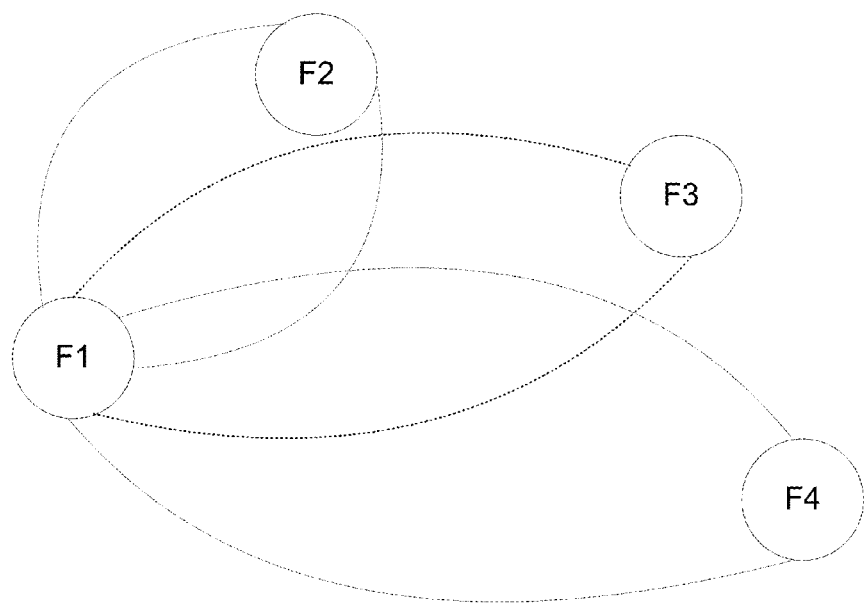
FIG. 4B shows another example of a visual display that can be used to adaptively depict relationships between a user and members of a focal group.

FIGS. 4A and 4B show examples of visual displays that adaptively depict the relationships between a user and other members of a focal group. The relationships depicted can include, for example, the reliability of one member of the focal group, or an affinity of members of the focal group with a user.

FIG. 4A shows a first focal group member F1 and a second focal group member F2. As shown, the first focal group member F1 has a first activity A1 (for example, playing tennis) involving the second focal group member F2, and the first focal group member F1 has a second activity A2 (for example, purchase of a product) involving or associated with the second focal group member F2. Based on the activities between the focal group members, rankings of the focal group members can be influenced. The rankings can represent the reliability and/or the affinity of each member with other members of the focal group. Clearly, the ranking can adaptively vary over time as interactions between the focal group members occur.

FIG. 4B provides another depiction of the relationship(s) between focal group members, and provides a relative strength of the relationship(s) between the focal group members. As shown, the first focal group member F1 has varying degrees of closeness with the other focal group members F2, F3, F4. The "closeness" can depict an affinity between the first focal group member F1 and the other focal group members F2, F3, F4. As shown, the first focal group member F1 has a high level of affinity with the second focal group member F2 because the two members are depicted as being closer to one another. The first focal group member F1 has a lower affinity with the fourth focal group member because they are depicted as being farther from each other. This display provides an informative method for a focal group member to establish the levels of affinity between the focal group member and other focal group members.

It is to be understood that the displays of FIGS. 4A, 4B are merely exemplary, and that other displays can alternatively or additionally be used to visually display to a user the strengths of relationships between the user and other focal group members.

Figure 5:
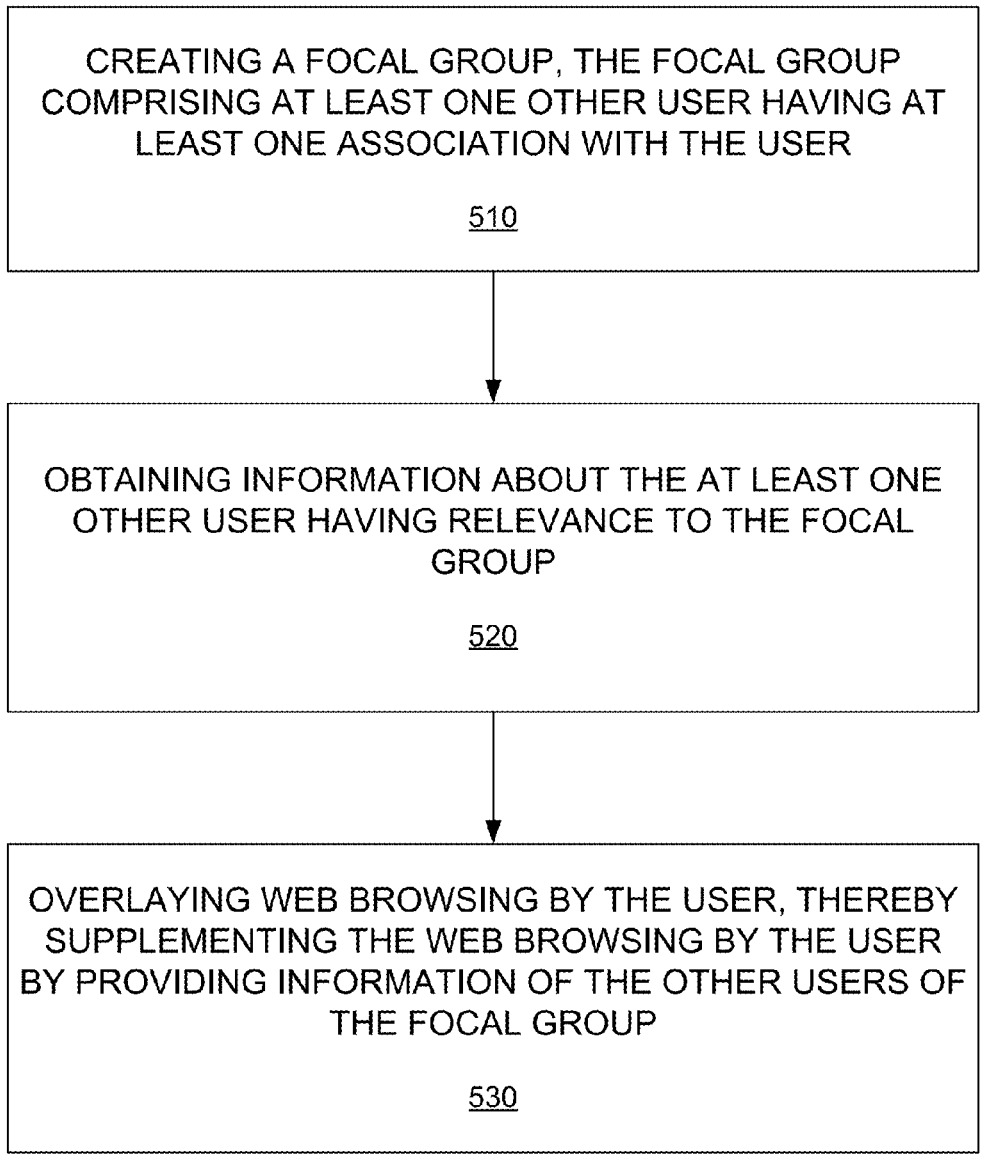
FIG. 5 is a flow chart that includes steps of an example of a method of overlaying web browsing with focal group intelligence.

FIG. 5 is a flow chart that includes steps of an example of a method of overlaying web browsing with focal group intelligence. A first step 510 includes creating a focal group, the focal group including at least one other user having at least one association with the user. A second step 520 includes obtaining information about the at least one other user having relevance to the focal group. A third step 530 includes overlaying web browsing by the user, thereby supplementing the web browsing by the user by providing information of the other users of the focal group.

As previously described, the overlay can be a plug-in that can be loaded on a user's computing device. The overlay enables a transformation of the state of information displayed on the user's computing devices, thereby supplementing the displayed information based on information of the other users of the focal group.

Embodiments as Disclosed by Provisional Application

Web 2.0 has connected individuals thru a mesh of social networks, portals, commerce sites and forums. Many of these sites attempt to model relationships to facilitate commerce and build recommender systems.

Yet absent from the web is a general, utilitarian mechanism that mimics interpersonal trust and reference networks. Imagine you need to find a babysitter, a heart surgeon or a plumber to remodel your bathroom. One turns to trusted friends to obtain references, since these providers involve the well-being or health of your family, or a significant amount of money (and typically frustration) in the case of the remodel.

A more mundane example is attempting to screen references for internet purchases like books or camera lenses. Amazon has an excellent mechanism for consumers to review books, but is the reviewer's opinion and taste relevant to you? Dpreview.com has an excellent forum with contributions from skilled photographers, but who are these reviewers? Any recommendation from a friend with similar taste in reading, or from a prosumer photo hobbyist, is trustworthy. How does the unknown reviewer on the internet compare?

Your friends, or their friends, have the recommendations or references you need; they just aren't available on the web. Three mechanisms are essential to securing a reliable reference or recommendation: trust, ranking/proficiency and a recommender system. A useful recommendation will be from someone you trust, with relevant expertise and experience, and similar taste or values.

A Web 3.0 solution that addresses this void would provide immense value to internet users, and represents an unparalleled business opportunity.

To be useful to users on the internet, the solution would need to overlay the internet with the social applications that bound a user to the activities, references and tracks left by the user's social networks. We describe this as a Social Application Overlay, since the overlay would overlay any internet website, combining the target website with the user's social networks through a variety of unique mechanisms. This would allow a user to leverage his social networks from any website.

Figure 6:
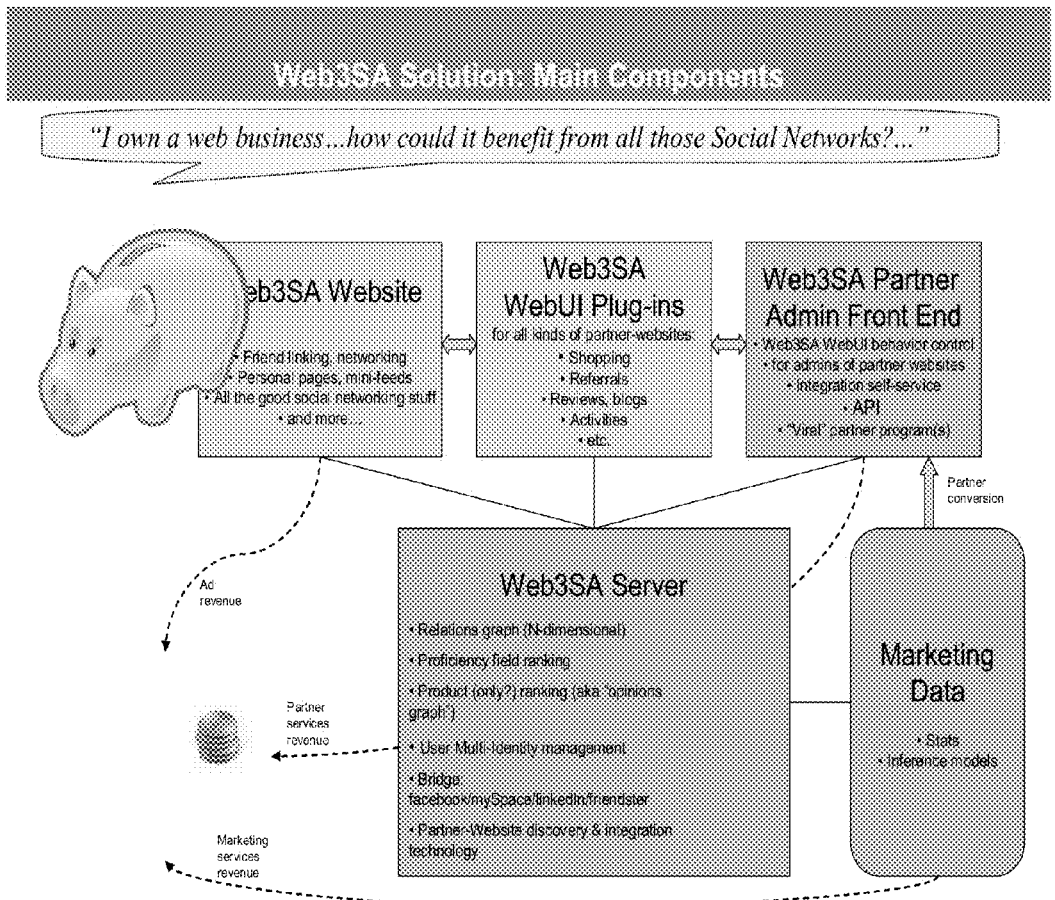
FIG. 6 shows a Social Application Overlay, according to an embodiment.

FIG. 6 shows a Social Application Overlay, according to an embodiment.

The solution has the following components:

A user's aggregated social networks—his/her social graph (SAG)—of trusted contacts, split and refined into specific Focal or Activity Networks, or FN and AN. This would connect users into categorized activities or focus areas, as opposed to broad, flat SNs.

A website would be used to manage these FN, and will allow users to import existing contacts from social networks, email programs, etc. The closest solution available currently is linkedin with its degrees of separation and ability to leverage your contact network; of course, the FNs would support ranking and categorization that is not available on linkedin.

Social applications relevant to any activity in the FN. Examples include mini-feeds of reviews, purchases, website recommendations and annotations, shared by the members of that activity.

A internet-wide social application overlay, or SAO, which lets a user access and leverage his social network and applications from any website. The SAG becomes an overlay on the internet, and provides immediate access to all of the applications and attributes of the FN, and simultaneously provides an FN based "frame of reference" to any web content.

Ranking and recommendation system based on the trust inherent in the FN, that measures activity-specific proficiency of users (ranking) and both product and service references (recommendation) for specific categories. The closest solutions available today are sites like Yelp, Angie's List or the Berkley Parents Network; however, these sites have no trust network hence recommendations are from strangers, unless you invest considerable time reviewing their contributions and assessing the contributors.

Programmatic APIs that allows partner websites to leverage the entire FN and SAO. Two APIs are supported, one to allow website integration with the FN (FN-API), and a second to allow development of SA on the FN (FN-SA-API). Websites with relevant content and databases of users can immediately create FN based social networks which can be accessed from and integrated with the website, either transparently or tightly coupled. This provides four benefits to the website:

an instant social network access to the larger SG and FN community the viral marketing (thru the FN) that will drive more users/consumers to that site, and the promotion of specific products endorsed by the community revenue sharing of product/service/advertisement accessed thru the FN community SAO.

Data mining of existing websites, social networks and databases to interact with the FN-API. Data can be used to update the social applications in the FN, for example to rank and recommend people and products.

Facebook and OpenSocial solutions to allow users of existing SNs to integrate with the FN.

Ecommerce site integration, (Amazon web services)

The Web3SA Social Application Overlay—SAO

The SAO allows access to any FN SA or service from any internet website. This unique technology allows a user to leverage his FN at any page on the internet. The technology recognizes a range of relevant items on any web page—Web 3.0 objects, urls, tags—and provides relevant FN services to each item or object. This technology is completely client side, so can operate transparently on the website.

At a webpage, plug-in and icon technology is used to identify objects recognized by a user's FN as relevant, or to operate on the object with FN services. For example, a user browsing for a product on an ecommerce site will see FN icons for known reviewers or for reviewed/recommended products. If the user selects the icon for a reviewer, a Web3SA frame will contain that reviewer's FN profile relevant to that category. Similarly, by selecting a product icon, a Web3SA frame with relevant reviews is displayed.

The range of object services includes, but is not limited to

Show FN reviews about the visited site and/or product/service used

Which friends have recently visited this site (or currently visiting), bought/used this service/product, or other related sites, products or services (this is on an opt-in basis to respect friends' privacy).

Add a site/URL review

Review/recommend products to FN

Rank a user

Request product review from FN

Share object with network

Show or search for similar services and products available from other Partner sites Buy product from FN vendor Annotate for FN or a particular user. Mark this page/product/service/website to be noted by friends (specify which FN or friend)

Read object annotation

Add to wishlist, save list, etc.

"Other people who used this site/product/service, have also used this other site"—a-la Amazon's suggestion of other books to buy. Although this is non-FN, it can be a value-add for the user, because "wisdom of the crowd" is useful even if it is a crowd of unfamiliar people.

Turn SOA Icon services on/off,

Turn SOA object icons-highlights on/off—to highlight all relevant objects navigate into the main Web3SA website While the list above appears overwhelming, simplicity of use is key and services are tied to context and objects. Only the relevant services are available at the appropriate part of the target webpage.

These object services are generally invoked by selecting an icon, or by highlighting text and mouse-clicking it, which in turn generates a pane/frame in—really above—the client browser. The icons can be embedded at partner websites, enabled for all objects, or will appear when rolled over. The frame appears above the web-page, and contains the relevant FN services that operate on/with that object.

The Web3SA Plug-in and Widget

Each Web3SA has access to the SOA thru the Web3SA plug-in, which the user must install in his browser.

Once installed, the user has access to an ever-present icon—the Web3SA Widget—hovering over any web page that the user navigates to. The widget may be on the page, or on the toolbar. The Web3SA widget can expand to a small window on mouse-over or mouse-click; the window has options to control SOA services on that web-page, typically to control SOA services available at that page, general SOA settings, or to navigate thru FNs, SAs, or to access the Web3SA site. Services that require frames are presented in a Web3SA frame.

SOA Services at Websites

The SAO services available on a website are split into three categories, depending on the level of integration of the website with the SAO:

Integrated—this website has been enhanced to interoperate with the FN-API and can therefore run SAs that leverage the FN Targeted—prominent web properties that the FN recognizes, with specialized support for the target service Standard—the standard SOA operates on all other websites Standard Websites No integration with the website is necessary; all FN services are delivered thru client-side browser technology, and all services are completely transparent to the web-server. FN services are delivered in a separate frame with no interoperability with the original web-page.

Even with this limitation, comprehensive FN services are applied to objects in the served page.

Targeted Websites

Web3SA will develop additional services to enhance user experience at prominent websites.

1.1.1 Search

Possible FN services on results for google search include:
highlighting pages with relevant FN content
filtering pages based on FN SA criteria
FN partner ad placement 1.1.2 Ecommerce FN services will be targeted for ecommerce content.
Integrated Websites (FN Partners)
Partners that integrate the FN APIs can invoke FN services or write SA for FN SNs. The website and web-server will incorporate embedded icons/services/SA that can be used to enhance the richness of the user's experience. For example, products on an ecommerce site can restrict reviews to the user's network, or to reviewers with a certain proficiency.

SOA Usage Scenarios

In this scenario, a user will leverage his FN photography network while browsing for a camera at an ecommerce website, say Amazon. The scenario goes thru the following steps:

1. Setting product and reviewer filters for proficiency and affinity utilizing the Web3SA Widget.
2. Finding the SOA icons for the product and reading the reviews in the Web3SA frame.
3. Finding the SOA icons for the reviewers and reviewing their profiles (in and out of FN) in the Web3SA frame.
4. Selecting the Partners Icon and reviewing offers from these partners (other ecommerce vendors) in the Web3SA frame.

1.1.3 Setting Filters for Proficiency and Affinity

The Web3SA widget hovers over the browser page; the user selects the widget and the Web3SA Settings Frame appears above the Amazon page.

The Settings Frame allows the user to control the placement and appearance of Web3SA icons on the browser page, set filters for affinity and proficiency for a variety of object services, including reviewer and product filters.

In this example, the user enables product, reviewer and partner icons.

Next, he sets product review filters at 8, set affinity at 7, and FN proficiency at 7, but FoF proficiency higher (since they are out of his network) at 9.

Once set, these settings influence the icons that appear next on the browser page.

1.1.4 Reading FN Reviews

Figure 7:
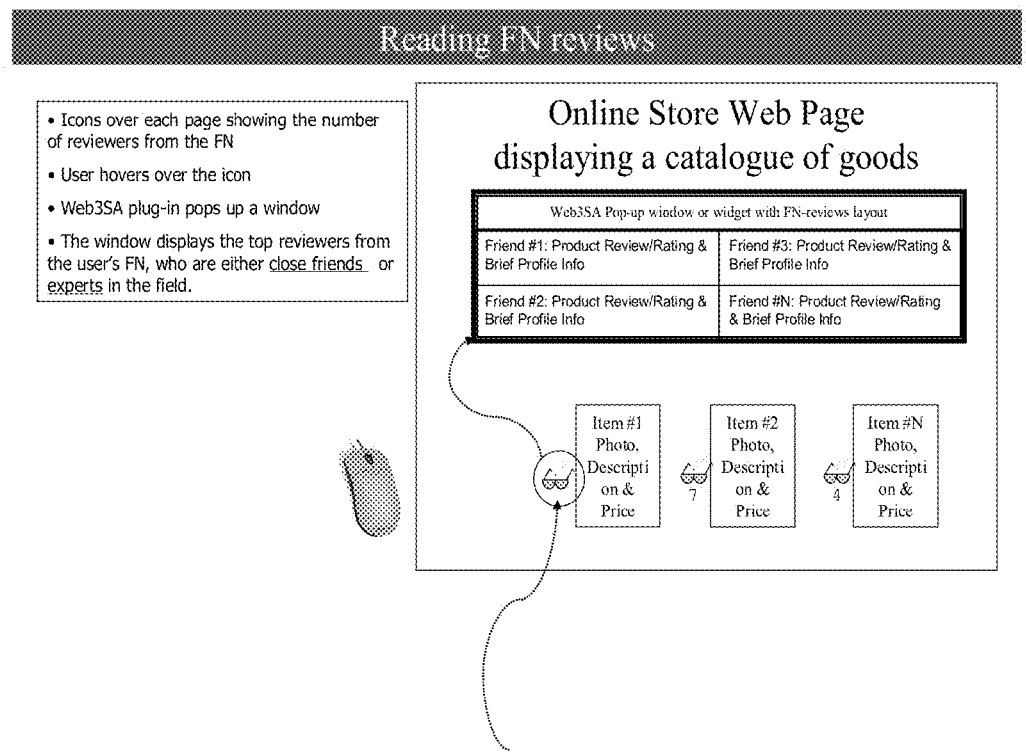
FIG. 7 shows an overlay that includes focal network reviews, according to an embodiment.

FIG. 7 shows an overlay that includes focal network reviews, according to an embodiment.

Figure 8:
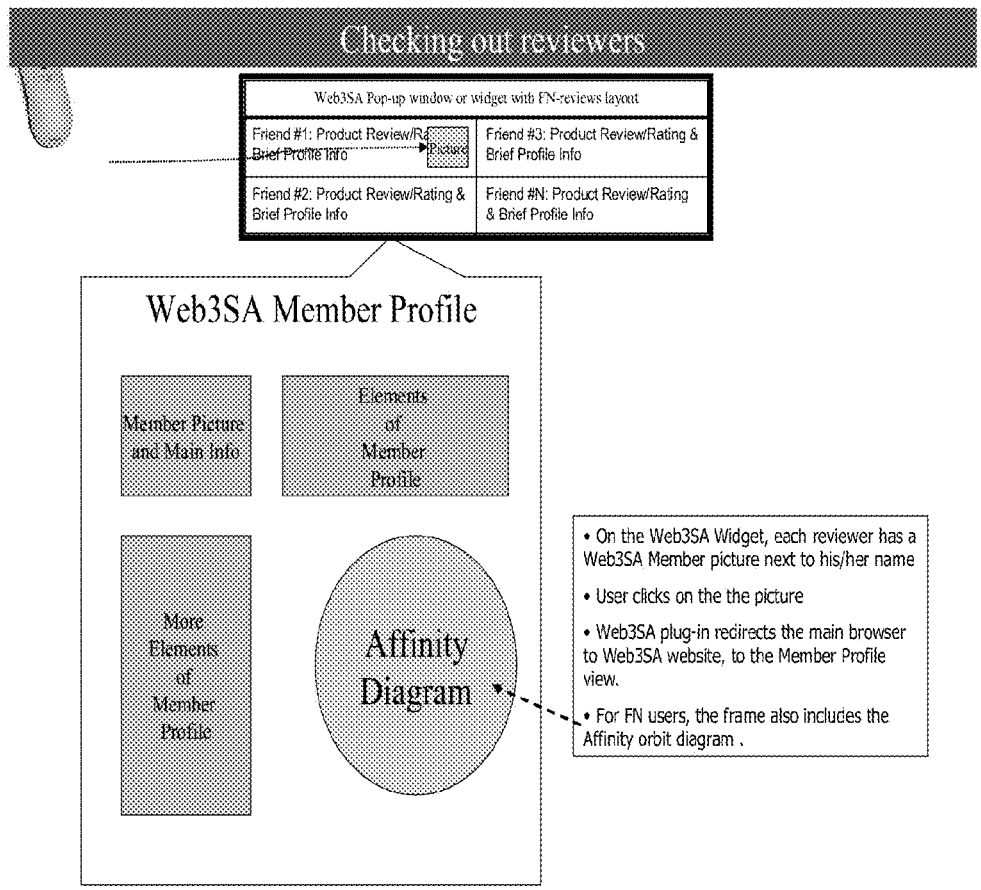
FIG. 8 shows an overlay that includes reviews of focal network reviewers, according to an embodiment.

FIG. 8 shows an overlay that includes reviews of focal network reviewers, according to an embodiment.

Now, the Amazon page has icons over all products and reviewers (next to their names on the Amazon page) matching the filter criteria.

One of the cameras has a Review Icon; the icon has a count with the number of reviews meeting the filter criteria set in step 1. The user hovers over the icon and a Web3SA Review Frame appears with the reviews, sourced from the photo FN (from the Web3SA servers).

The user brows the reviews, but needs more information about who these reviewers are.

Checking the Reviewers Out

Each reviewer has a Web3SA User Icon next to his/her name. The icons appears on both the Amazon page, and the Web3SA Review Frame.

Reviewers are either in the photo FN, or FoFs that match the filter criteria. The Web3SA Review Frame displays user profiles for each user. For FN users, the frame also includes the affinity orbit diagram. Other items on this frame include all icons relevant to navigating the FN.

Suggestions From Other Vendors

Figure 9:
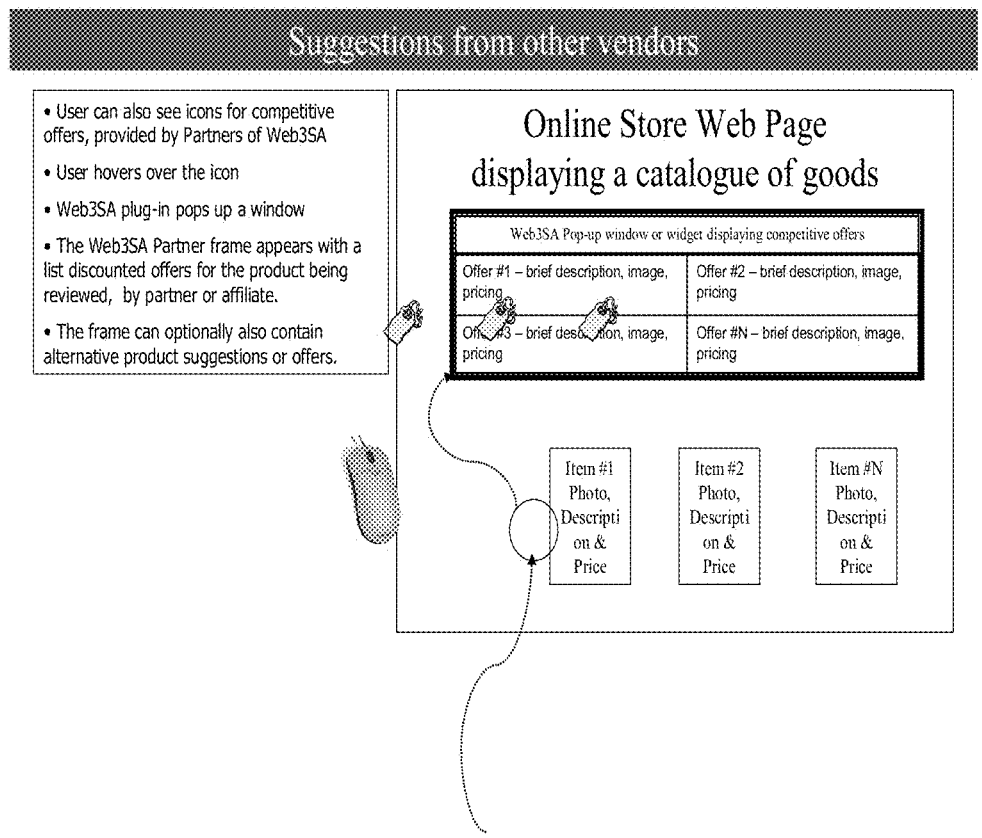
FIG. 9 shows an overlay that includes suggestions from other vendors, according to an embodiment.

FIG. 9 shows an overlay that includes suggestions from other vendors, according to an embodiment.

The user has access to the Partner Icon from both the Amazon page, and the Web3SA Review Frame.

This is consistent with the Web3SA navigation paradigm, that icons be available on both website and Web3SA frames, and that they be contextually relevant to the objects they service.

By hovering on or clicking the partner icon, the Web3SA Partner frame appears with a list discounted offers for the product being reviewed, by partner or affiliate. The frame can optionally also contain alternative product suggestions or offers.

Focal Networks

The Web3SA solution is a unique service that allows consumers to consolidate their focal and social networks at a single, independent site, and then leverage them from anywhere in the internet.

Essential elements of the solution:
Consolidates social networks into one SG
Categorized networks by activity or focus (FNs)
Aggregation from other SNs, automated
Interoperable (FOAF, XFN compliant)
SG portability
Proficiency
Affinity within the FN
Extensible SA—The FN will also expose an API for development of additional SAs
Reference lists—people, service providers, products The core paradigm of the solution is that large, flat networks inherently consist of weak relationships, with limited utility. By grouping people into smaller networks, information and functionality is relevant to the focus of the network.

In this way, the FN attempts to model a user's real-life relationships in the same way they are utilized in social interaction, and bring the benefits of these relationships to the web.

These fine-grained networks are dedicated to the activity or focus, for example friends, family, hobbies, and interests. These networks are combined with SAs like group sharing and notification, mini-feeds, user proficiency ranking, product and service recommendation services.

Each FN is a $1^{st}$ degree network. The relationships between the FN owner and the members will vary, based on the strength of the connection, which we describe as an affinity. The affinity of each member places him in a relationship orbit around the owner. Over time, a member's orbits/affinity can change, based on the interaction between the two.

The Web3SA and FN Profiles

Figure 10:
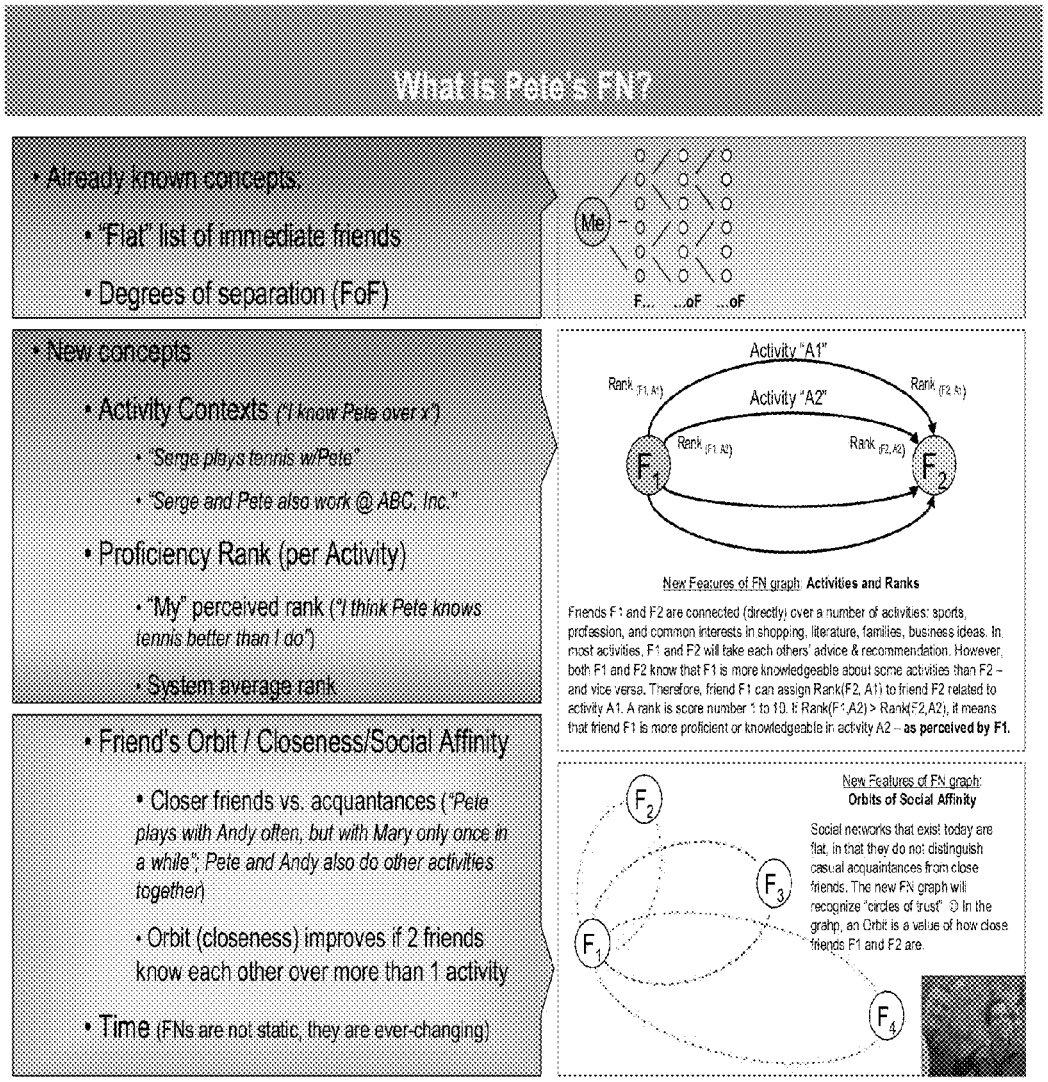
FIG. 10 shows an example of information of a user's focal network, according to an embodiment.

FIG. 10 shows an example of information of a user's focal network, according to an embodiment.

A user's Web3SA profile contains:
The users personal data
a list of FN
reference lists to service providers, products, people
his proficiency ranking for various categories, activities and FNs.
Each FN contains
members in the network
the affinity of each member to the user
Vendors, websites, services tied to this activity, membership wrt these
mini-feeds
product reviews
object recommendations Each user will have the ability to create public and private profiles; in all likelihood, users will probably prefer to use different usernames to segregate public and private FNs and SAs.

Super-FNs

There are a number of "super-FNs" generated and maintained by Web3SA:
1. System Aggregated Social Graph (SASG). This is a user's complete social graph, generated from SN imported from other sites. The user can browse this SG and import individual connections into his/her existing FNs.
2. The worlds view of a user's FN's or SG—WVSG: The system will allow a user's connections, or even strangers, to edit the user's FNs and SASG, subject to permissions granted by the user. [IP].
3. Proficiency based FNs. A user can browse his FNs, and those of his network, searching for members with proficiencies in specific areas.
4. Vendor/website created FNs
Managing FNs at the Web3SA Website
FNs can be created at the Web3SA website or thru an FN-API from partner websites.
Users will be able to manage all of their FNs and SAs at Web3SA.com.
FN management:
Building and managing FNs
inviting contacts to join FNs
importing contacts or SNs into their SASG
Viewing their WVSG
Managing system/partner generated FNs
SA Management
Managing and utilizing SAs on an FN
Importing, publishing and sharing SAs
Reference and proficiency management:
Managing service provider references
searching the website for service providers Affinity Within a FN, affinity is used to model the proximity of the members to the owner of the FN. Each member has an affinity level, from 1 to 10, to the owner. Thus, members are placed in affinity orbits, a gradation/refinement of relationship within $1^{st}$ degree FN. FNs can be viewed in orbital diagrams, providing an exciting visual representation of the FN.

Affinity changes over time, based on interaction, bit also subject to owner overrides. [IP] The dynamic nature of the affinity model social relationships, and is useful filtering operations within the SA. Other uses for affinity within SAs? Things that affect affinity levels include updates by partner website, level of interaction, etc. The owner can control this by marking a friend at a certain affinity, filter enemies/idiots.

Affinity is especially useful in personal reviews, since they capture the relationship of reviewer to user vs service provider so well.

Affinity in vendor created FNs?

Data Mining Existing Content Into the FN

The internet has untapped, structured data that can be used to build Activity Networks or SA within the FN.

Utilizing the FN-API, websites can dynamically construct ANs for their users. At their next login, these users can then be presented with these AN which they can chose to use or discard. Current FN members can edit the AN and add to their existing SG, non-members can join the FN.

These AN are shared by the owners of the website and Web3SA; the AN and FN services can be fully integrated into the target website, or be utilized in the FNSOA frame. Web3SA, the website owner and the consumer all benefit. The website owner gets access to an SN and SAs; the site and brand are exposed and virally marketed to the extended FN community. The consumer benefits by incorporating another portion of his internet footprint into his FN.

For data-mining, we classify websites in the following:
Sites where users have identity, interact and create relationships that can be classified into FNs with affinity-relationships.
Sites where users have identity, but with limited interaction between users. These sites can leverage FNs and utilize SA, but typically not create FNs.
Websites Examples
Activity based—Examples include oneclicktennis.com, Categorized/canonical databases that model user interactions. New connections can be built and affinity and proficiency ranked. [Example: create new relationship when 2 tennis players have played more than N matches together, using the number of matches as an indicator of affinity and the tennis player Dynamic Rating as proficiency rank].
Ecommerce—(amazon.com, buy.com, newegg.com . . . ). At these sites there is limited user interaction, it is primarily user-to-website interaction. Thus, these sites' historical data contribute less to the creation of new FN, but can enhance SA and proficiency ranking [Example 1: X buys a lot of books about subject M. His friends Y and Z can benefit from seeing X as "more knowledgeable" about subjects M and N, and elect to receive mini-feed from all kinds of partner sites regarding X's activities related to subject M. Example 2: Recognizing who reviewers are, aka Elimination of the Stranger syndrome]

Ecommerce sites may create their own FN dedicated to shopping, style, reviews, etc.

Forums/communication/user-press—email, reviews, chats, blogs. In these sites, users do interact with each other via plain-English (or other lang.) communication. Thus, the exact nature of their interaction is harder to deduce and generally not structured into a data model, and it requires data-mining technologies such as natural-language semantical parsing. However, most such sites do offer a mix of both canonical/formalized DB records that can be directly mediated into new FN graph-building blocks, as well as "vague" natural-language interactions—text exchange, commentary, emails, editorials and user reviews [Example: user X who has exchanged 200 emails with user Y in the last 500 days is probably a good evidence that X and Y are at least acquaintances—we can infer this directly in the website's email-DB, without doing any NLP]

sites w/o user identity/login—(cnn.com?, etc.)—These sites lack SA content.

Reference and Recommendation on the Web

Solving the Stranger Syndrome

The FN will address the Strangers on the web Syndrome, by combining social graph and the SOA to retrieve user FN profiles from any property on the internet.

There are numerous, prominent websites—Ebay, amazon, yelp—that track users in various ways. Ebay includes buyer and seller rankings, Amazon and iTunes include product reviews, Yelp and Angie's List include service reviews. To the reader, these reviewers are strangers, with no relationship to the reader. We call this the Stranger Syndrome. All forums suffer from the same issue. Fundamentally, the reader must spend considerable time learning about each reviewer, or trust the wisdom of the crowd mechanisms (ranking of individuals by the users of the site).

The FN solution addresses the stranger syndrome at any website by retrieving the stranger's FN profile, in its entirety or a specific to the website focus. The mechanism used depends on the level of FN integration of the website; a fully integrated website can access specific FN services appropriate to the website, while a non-partner site will retrieve information based on tags, urls or with user input to retrieve required information from the FN.

Product, Services and People Are Not Equal

Web3SA recognizes that the best sources of recommendations are those you trust; fortunately, they also care enough to respond to your requests for recommendations, and to proactively post their recommendations where their friends can find them.

The Web3SA reference network overlay is a social application. Will users create a network of references to service providers? Traversing the reference network overlay will benefit the user, who will in turn generate his own recommendation of the service provider.

Product references are straightforward; typically there is little for a user to gain by recommending a poor product. She wouldn't do that to her friends. Product recommendations can often be bound to AN, cameras for photography FNs, clubs for a golf network, etc. Others are reference-able, but may not be bound to an FN, novels or music, for example.

Recommending service providers is more complex, especially if they are friends.

Services on the Internet—How to Choose a Knee Surgeon?

Reference for services, as opposed to products, on the internet is an untapped business opportunity. The FN will offer a SA written specifically to allow friends to share and solicit existing references to service providers: heart-surgeons, lawyers, contractors, baby-sitters, etc.

The existing sites all suffer from the stranger syndrome, and there is no analogue to linkedin's business network for the valuable references and relationships held by consumers of services. Linkedin allows one to search thru the business relationships beyond the $1^{st}$ degree. This search allows one to get to a destination, with minimal support for the criteria necessary for an effective search, namely the proficiency of target and the affinity/trust of the recommender.

How does one find a good knee-surgeon? By leveraging the FN to find one ranked highly (proficiency) by those with the greatest (or perhaps least?) affinity to the seeker. When trying to find a target service, a seeker cares about proficiency and affinity, and access to the reviewer (his ranking and my affinity to him) and why he/she recommends this provider. The reviewer's affinity to the service provider also matters, as opposed to the seeker's affinity to the reviewer (does the reviewer care about the seeker getting the best provider or is the objective to help the service provider find one more client?)

Optimizations:

"Anti-Shilling" filter for reviewers with or without high affinity to service provider Normalization filter for reviewers The target need not necessarily be in a user's FN; the ability to traverse the FNs of those in the user's own FN is still more effective than a search outside the FN. The most proficient surgeon may not be in the user's FN, the user would traverse the FN to find the one with the highest proficiency. Proficiency here is the system ranking (wisdom of the crowds) of the surgeon.

Affinity, Proficiency and Reference

A user can prioritize (filtering and sorting) the product reviews based on his FN affinity with the reviewer, and the reviewer's perceived proficiency in the subject (both user and system-wide proficiency rankings).

Use Case Demonstrating Reference Propagation Across FNs.

A real life example. I was invited to a party of my OneClickTennis friend who used Evite.com to get RSVPs for the event. The food at the event was provided by a catering company. A lot of guests liked the catering service and would now recommend it to others.

Now, suppose that OneClickTennis and Evite are both Web3SA partners, and I have an FN for each. On the Evite FN I see all my friends who also visited the party (and many of whom are NOT tennis players). If one of these friends added a review of the catering company and website and I endorse the same review, it gets propagated through my profile to my other friends on the one or both FN minifeeds, and remains permanently accessible.

Next time one of my FN friends looks for a caterer, they are going to see my endorsement, and the review of my non-tennis friend (he is a FoF for them).

Utility to the FN users, endorsement and business for a deserving vendor!

Proficiency

Proficiency is associated with FN, activities, services, etc. The system will rely on a manual ranking to conclude wisdom of the cloud proficiency ranking, Within a FN, the owner will also be rank each contact, and can utilize both owner and system proficiency rankings in SAs, searches, etc.

How does proficiency differ from reputation?

State of Social Networks and SG Trends

Limitations with Social Networks

Existing social networks are typically large and flat; insular, and everyone is one degree away from you—friends, colleagues, associates, and people are often invited to "connect with" strangers. The driver behind this seems to be that a large network is beneficial, indicative of popularity, influence, connectedness, etc. The value of a massive glut of first-degree connections is similar to the value of large volumes of information on the internet. Refined, high quality networks are hidden in the first degree network and mining or utilizing them is inefficient. As with all things internet, the fad tends to overwhelm.

The challenge faced by all SNs currently is stratification of the $1^{st}$ degree network, but this conflicts with the DNA and business model of these SNs, which is to enroll as many eyeballs as possible. Paradoxically, one could argue that since everyone is always 6 degrees away, proximity in small networks is identical to large ones, but with fewer, more authentic interconnections.

Another frustration for users of SNs is ownership and interoperability of the distributed and fragmented social networks. The trend is for SNs to support interoperability and APIs, (FOAF, XFN, hCard, OpenIdentity), but ownership and identity remains fragmented across various sites. How does the consumer get control of his/her own social graph and identity, and manage this independently from vendor sites? Equally important is the ability to control and determine contextual privacy.

Another aspect to this is the lack of a common identity (identities) across the web, so that random encounters of users on the web point to the identity of the user. If the identity also included one's social graph, then the reader's relationship to the user would be contextual.

Social Network Portability and the Social Graph

All current SNs are walled gardens; the SN is isolated to a particular service.

Until recently, none of the existing SNs exposed or leveraged their SG beyond the service itself The latest trends are to reverse this; there are open source developers proposing and implementing solutions to export and aggregate walled SNs into a user's SG. Our expectation is that by late 2008 there will be open source solutions that allow users to consolidate their SNs into portable, global SG. But then what?

Elevator Pitch

Patented mechanism to overlay/leverage or combine SNs with existing internet websites $1^{st}$ degree in existing SN too large and flat, does not model personal relationships SG needs to be accessible across the internet, not isolated to major sites SG needs to be refined to focal areas (categorization)

Affinity, proficiency, ranking, recommendation

Mine existing websites to enhance SG, API into Focal Network engine

Benefits to the Consumer

Control one's own social graph

Present the broad social graph and allow user to edit it into FNs. Primary benefit is Refine/reduce information overload.

Create meaningful FN

Import, manage and export of data. Allows user to aggregate and then own their data. Integration of fragmented identity Contextual privacy User centric (web.3.0) net Shared or group identities, a couple sharing email?

Vendor/Websites Offers/Promotions

Vendors/websites will offer incentives to members of activity specific FN. For example, a vendor may offer points/benefits to FN owners/members who enroll the FN in relevant sites. Sporting goods vendors to sports oriented FNs. [IP]

Group Buying Power

Web3SA Revenue Sharing With Users, Equity Promotions

SWOTs

Benefits to Partners

Instant SNs at the Partner Site

Most ecommerce vendors, or click-and-mortars, have no access to SN or SA. The FN is potentially an exceptional marketing vehicle, one that can be used to for viral marketing, promotion, sales and analysis.

Access to the Entire Web3SA Community

By creating FN and connecting to the Web3SA solution, partners get indirect access to a larger community. This indirect access is all thru FNs, so is a trusted conduit to FoFs.

FN is Beneficial to Customers

Partners can market and capitalize on the creation of FNs as beneficial to their customers.

The partner can deliver the FN to the customer gratis; no effort is required by the customer to create the FN. The FN can be used to website related activities, to promote merchandise, offer discounts, etc.

Viral Marketing

The FN is a viral promotional and marketing tool for any website, since partners can leverage their content and users to create SNs and expose them to the entire Web3SA community.

Enrollment in Vendor Sites/Services

Enrolling users into multi-vendor sites/FNs. Users may join multiple FNs, and enroll in multiple sites simply by joining a FN. When users invite friends to join FNs, these friends may opt-in to enrolling in sites that service the FN.

Market Research and Analytics

The FN can be used to track user and product reviews, solicit customer input, etc.

SWOTs

How do we get Partners to promote it to their Partners?

Vendors resist sharing customers

Want to own the FN. Perhaps they should.

Want to control what users do on FN. This is important

Social networks, including SN search

Social applications—groupshare, entertainment

Recommender systems

Ranking systems

Trust networks

The following elements are unique:

SAO to the internet, filter based on proficiency, affinity

Overlay threat—new vendors, products, FN advertising

Overlay based on content, not mouse. When landing on page

Gui=icons of relevant items, icon to expand relevant items

SAO methods/mechanism, either integrated or not

FN overlay plus methods, eg search for FN user from amazon, plugin search for FN attributes of displayed content (dynamic, automated)

My world network and methods to autogenrate and manually add relationships

Reference Network Overlay

Single invitation to a SN can automatically/optionally register/user user with provider and vendor sites.

FN page ranking, specific to each user/FN, based on content and reviewer, proficiency affects, Affinity/orbits—gradation/refinement of relationship within $1^{st}$ degree FN, affinity of reviewer to user vs service provider. Method to rank and display SA attribute/service, by affinity, dynamic affinity to model real social relationships, method to modify affinity over time based on level of interaction (API, surveillance by user of friends), affinity changes over time, fed by partner website/lack of interaction reduces affinity/user can control this by marking a friend at a certain affinity/, filter enemies/idiots Method of creating SN by crawling websites with non-SN data (also SN sites) to deduce social connection, SG semantic indexing FN proficiency methods for service providers (wisdom of crowd, user specific) to construct aRN with RNO Ability to create non-FN (asymmetric) for any SA (feeds, and FN-API). Only monitor registered users who have profiles where they agree to share info Gui RT feeds to/from vendors when users are shopping; competitive offers when browsing for products. Sale bar from different vendors for each product.

Group buying on or off RT feeds.

Affinity notes: want reviewers to have no affinity to SP, maybe not

How do we gauge negative

Business Model

Web3SA will be free to consumers; all revenue will come from ads

Advertising Revenue

Ad placement on both the Web3SA site and SOA frames will be sources of revenue.

Contextual/targeted ads—by FN, SA

Query based ads—by service provider, product search, FN, SA

Affiliate Revenue from Partners

Web3Sa will provide purchase-point click-through to merchant partners. It is a pay-for-performance. Variations include, banner exchange, pay-per-click, and revenue sharing programs.

Banner Exchange—trade banner placement.

Pay-per-click—for a user click-through.

Revenue Sharing—a percent-of-sale commission based on user click-through in which the user subsequently purchases a product.

1.2 FN Licensing to Partners

License access the Web3SA solution to enterprises, website owners, etc. By number of users?

Marketing

Viral Marketing—How to Reach 25 M Consumers in 6 Months

Incentives for Users

Vendor/websites offers/promotions—yes!

Group buying power—yes!

Web3SA revenue sharing with users—nah, desperation move equity promotions—nah, desperation move Make it Effortless to Build FN Thru Partner Enrollment Web3SA will aggressive pursue a variety of potential partners. If Web3SA enrolls 5 partner sites, each with a database of 200,000 users, up to 1 million new member nodes may be created.

Each of these 1 million users will have:

an automatically created account at the Web3SA website;

one or more FNs—each FN focused on the website it was created (discovered) from. The FN is only for the websites that this user is a member of None of this was created by the user—the user spent zero time and energy adding this info, it is automatic!

When the user (who never registered) gets an email from her website, telling her that she just got added to the FN, she will log into the FN and see all the FNs that she is a member of, with a graph of Friends of different affinity, that are all experts in some areas (childcare, sports, science, literature, computers, etc.) Nice!

Targeted Verticals

Enterprise, FNs and Social Applications

Competition and Differentiation SWOT

Web3SA Differentiation

Major SN services will all have

SG (future)

Categorization or grouping (minimal)

Social applications—photo-sharing, group sharing, etc

Application APIs (facebook) and APIs (opensocial)

SG exportability and aggregation (some)

Activity mini-feeds (plaxo pulse)

Many other SNs offer similar SA capabilities, but these are walled gardens singularly focused on the social network itself. The basic premise is this: Facebook, Myspace, LinkedIn, and the like all expect the world to create user accounts in their sites and visit everyday. Other than entertainment, they don't offer much in a way of services to their visitors—the kinds of services available elsewhere throughout the Web—other than the service of interacting with their friends. But what Web3SA does is the reverse: we make all sites & services on the internet "social-application-capable".

How is it differentiated from other social networks? In general, most networks are flat and broad, the larger the better. BFSNs. Separation vs consolidation. Major drawbacks:

Users unranked, no categories.

What is the networking paradigm: loose, broad or restricted? Is it up to the user? Does it become an experts network? A focal network—tennis, babysitter? Breadth for dissemination of information, narrow for trust?

SWOT

Strengths

SOA

FNs

SAG

Reference networks, utilitarian nature of solution

Completeness of solution

Weaknesses

No customers

Lack of critical mass

Opportunity

No SG technology that can be applied to existing websites

SG paradigm today is too broad (unranked, unfiltered)

Mine existing hosts/sites to build SG, with API/engine to support this

Site agnostic, global SG perspective—view SG from any website, the SG overlay

Proficiency ranking, proximity ranking

Non SN host (oneClick) will want SN presence. Making FNs available to them

Threats and Mitigation

No IP protection—need to be first mover, need viral adoption

Technical challenges with SOA—

Vendors find ways around SOA

Litigation against SOA
Major stakeholders deploy competitive technology
Limited adoption—see weakness
Competitive Categories

| Category | Competitor | SWOT |
|---|---|---|
| SN/SA | Facebook | |
| | Myspace | |
| | Ning | |
| | Orkut | |
| | Friendster | |
| SG aggregators | Plaxo | |
| | Facetplay? | |
| | Yahoo 360 | |
| Reference services | Angie's list | |
| | Yelp | |
| | LinkedIn | |
| Activity aggregators | Spokeo | |
| | twitter | |
| Social search | | |
| SA platforms | Facebook | |
| | OpenSocial | |
| | Ning | |
| Vikram . . . | | |

Use Cases—OneClickTennis (I put on the hat of OneClickTennis.com's website administrator and think what I would have to do to enroll it as a member of the FN).

1. OneClickTennis com is a tennis player matchmaking tool. It matches up tennis players by skill level, schedule/time availability, geographical location, etc. For each member tennis player it provides:

A calendar tool for tennis match scheduling
A "last minute pickup" auction of available tennis players
A match result and opponent feedback form
Tracking of one's standings/rankings in multiple tennis ladders, tournaments and other events/venues/playlists.
History of matches, graphing of player's performance levels over time.
In the background, there is a statistical inference engine at work that calculates everyone's dynamic rating (skill level) and creates matches between closely-ranked opponents, thus ensuring that each match will be interesting for both players.

The website also features:
personal & group coaching sessions
league play (coming soon)
doubles mixer events
local tournaments and cross-area championships As an admin of OneClickTennis.com, I become an architect of the default FN for each of my site's members. Once I'm done, each user will do his/her own fine-tuning. There is a wealth of relationship/friendship information I could deduce from my database. I can enroll my website into the FN server by using the following approaches and considerations:

a. When two (or four) players play a tennis match, they become acquaintances and form a connection in the FN graph. All such connections are of type "OneClickTennis" (with possible sub-types based on activities within my website).

b. People who have played w/each other more often are likely to be closer friends: thus, the number of matches played together can serve as an Orbit rank.

c. Being a partner (playing on the same side of net) in a doubles game is a more "friendly" experience than playing as opponents. Thus, two partners who have played N matches together are closer to each other than two opponents.

d. Being on a league team (e.g. representing your tennis club, city, university) creates strong ties to other team members that often go beyond tennis. Thus, members of the same league team will get an extra Orbital proximity rank.

e. OneClickTennis uses statistical modeling to calculate the level of tennis skill of each player. This value can be used as an indicator of Proficiency.

f. It should be noted that the main idea of Proficiency Rank is for one friend to indicate how much he/she respects the opinion of another friend about X. Just because someone is a better player or have played a lot more matches doesn't necessarily make one a good source of advice about tennis. However, the reverse is typically true. So, the approach in (d) and (e) is by no means perfect, but . . . As an admin, all I can do is provide this Proficiency Rank as a "conversation starter" to get my users to start thinking and re-ranking manually those people whom they really trust and take advice from.

g. Another value that can be used for Proficiency is the total number of matches played and the total length of membership.

h. OneClickTennis is a tool for organizing various tennis-related activities: coaching clinics, mini-tournaments, doubles-mixers. The information about each member's activities can be used to form activity-related sub-graphs (each members sees them as small subnets within his/her overall FN) within the "OneClickTennis" main activity. For example, I'd like to create a subnet for each league team.

I use the FN API (it is a synchronous SOAP/ XML/HTTP API):

i. Fn=createNetwork(networkName)—add OneClickTennis-specific connector type j. Activity=Fn.createActivity(activityName, description)—add description of a sub-FN (e.g. the name of each league team or university/college/high-school team, or the name of a tennis ladder)

k. Activity.addFriend(anotherFriend, orbitRadius)—I will call this for each tennis match, since each match creates at least a basic connection between two people. The number of matches played is used to calculate the orbitRaduis (i.e. the affinity between friends).

l. Activity.setProficiency(friend, beholderFriend, proficiencyRank)—sets the proficiency rank of friend—as perceived by the beholderFriend. (in particular, this is what I expect the end-users to correct and fine tune later). In OneClickTennis, I have this info from 3 values—so I may need to come up with a formula how best to merge these 3 values into 1, the proficiencyRank. The 3 values are: membership length, total # of matches played, and the statistical skill rating.

After I import the initial data from my website into the FN server, I also program these simple calls into my website code, so that it sends updates and new data on the fly.

I log in into the Admin pages of the FN server to see the resulting social graph that was created this way from the flat user database at my website OneClickTennis.com.

Although specific embodiments of the embodiments have been described and illustrated, the invention is not to be limited to the specific forms or arrangements of parts so described and illustrated. The invention is limited only by the appended claims.

What is claimed:

1. A method of providing a user with a web supplement, comprising:

providing, by a server, access to a computing device to a group of the server, the group comprising at least one member having at least one association with the user, wherein the group comprises a restricted group of people who are associated based on activity or topic;

providing, by the server, access to a computing device to information associated with the at least one member having relevance to the group, wherein the information is ranked by a level of importance;

adaptively updating the information associated with the at least one member having relevance to the group based on web activity of the user; and web supplementing the user by providing information of the members of the group, comprising providing the ranked information associated with the at least one member on a web application displayed on the computing device that is related to information of the web application, comprising manipulating the information of the web application based on the ranked information.

2. The method of claim 1, wherein supplementing the user by providing information of the members of the group comprises executing the web application or a plug-in loaded on the computing device to supplement web interaction on the computing device.

3. The method of claim 2, further comprising the web application or the plug-in providing the user with a web overlay, the web overlay providing the information associated with the at least one member that has relevance to the web interaction of the user.

4. The method of claim 2, further comprising the web application or the plug-in having access to the group, and having access to the information associated with the at least one member of the group.

5. The method of claim 1, wherein supplementing the user by providing information of the members of the group comprises a group overlay to the web interaction displayed by the computing device of the user.

6. The method of claim 5, wherein the overlay provides at least some of the information of the at least one member of the group.

7. The method of claim 5, wherein the overlay filters information of the web based on the information of the at least one member of the group.

8. The method of claim 5, wherein the overlay sorts information of the web based on the information of the at least one member of the group.

9. The method of claim 5, wherein the information provided by the overlay relates to information of a web server being browsed by the user.

10. The method of claim 5, further comprising filtering the information provided by the overlay based upon the information of the web server.

11. The method of claim 5, wherein the overlay comprises highlighting at least one web page with visual identifiers, wherein the visual identifiers are related to the information associated with the at least one member having relevance to the group.

12. The method of claim 5, wherein the overlay further comprises at least one of fetching or requesting the information of the at least one member of the group.

13. The method of claim 1, further comprising at least one of filtering, sorting or appending information to information of a web page based on the information associated with the at least one member.

14. The method of claim 1, wherein the ranking of the level of importance of information is influenced by a perceived level of importance of each of the at least one member associated with the information.

15. The method of claim 14, wherein the perceived level of importance of each of the at least one member is influenced by at least one of a member rank on a relevant topic, a level of affinity between the user and each member, a level of expertise of each member, a level of trust of each member, a level of performance of past information provided by each member, a level of proficiency of each member.

16. The method of claim 15, wherein the level of affinity between the user and each member adaptively varies over time based on actions of each member, or the user.

17. The method of claim 1, further comprising executing at least one group application within a web overlay or browser based on information of the members of the group.

18. The method of claim 17, wherein executing the at least one group application comprises requesting additional information from the members of the group.

19. The method of claim 1, further comprising allowing a user who is not a member of the group to utilize and contribute to the web application or an overlay associated with the group, wherein the user has indirect or no participation with the group.

20. The method of claim 1, further comprising creating a reference network overlay which is shared by a plurality of users, wherein the plurality of users includes ranked users of the group and ranked users who are not a part of the group.

* * * * *